US011254417B2

(12) United States Patent
Tsai et al.

(10) Patent No.: US 11,254,417 B2
(45) Date of Patent: Feb. 22, 2022

(54) MULTI-SECTION SPOILER

(71) Applicant: THE BOEING COMPANY, Chicago, IL (US)

(72) Inventors: Kevin Tsai, Seattle, WA (US); Lisa Schleuter, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 394 days.

(21) Appl. No.: 16/216,822

(22) Filed: Dec. 11, 2018

(65) Prior Publication Data

US 2020/0180750 A1    Jun. 11, 2020

(51) Int. Cl.
*B64C 9/20* (2006.01)
*B64C 3/50* (2006.01)
*B64C 13/28* (2006.01)
*B64C 9/32* (2006.01)
*B64C 9/00* (2006.01)

(52) U.S. Cl.
CPC ............ *B64C 9/20* (2013.01); *B64C 3/50* (2013.01); *B64C 9/323* (2013.01); *B64C 13/28* (2013.01); *B64C 2009/005* (2013.01)

(58) Field of Classification Search
CPC .... B64C 9/20; B64C 9/04; B64C 9/06; B64C 9/10
See application file for complete search history.

(56) References Cited

U.S. PATENT DOCUMENTS

| 7,243,881 | B2 | 7/2007 | Sakuri et al. | |
| 9,688,384 | B1 | 6/2017 | Balzer et al. | |
| 2005/0011994 | A1* | 1/2005 | Sakurai | B64C 9/16 244/212 |
| 2007/0176051 | A1 | 8/2007 | Good et al. | |
| 2010/0320332 | A1 | 12/2010 | Voss et al. | |
| 2012/0292452 | A1 | 11/2012 | Parker | |
| 2014/0145039 | A1* | 5/2014 | Beyer | B64C 9/16 244/215 |

\* cited by examiner

*Primary Examiner* — Richard R. Green
*Assistant Examiner* — Nor Alaa Bashash
(74) *Attorney, Agent, or Firm* — Moore IP Law

(57) ABSTRACT

An aircraft spoiler mechanism includes a spoiler fore-section, a spoiler aft-section, and a reverse-motion linkage arm. The spoiler fore-section includes a forward end, a hinge end, an actuator coupling, and a pivot coupling to couple to a wing structure of an aircraft to enable rotation of the spoiler fore-section relative to the wing structure. The spoiler aft-section includes a hinge portion coupled to the hinge end of the spoiler fore-section and a crank-arm. The reverse-motion linkage arm includes a first end, a second end, and a pivot point coupled to the forward end of the spoiler fore-section. The spoiler mechanism also includes a first linkage to couple the first end of the reverse-motion linkage arm to the wing structure and a second linkage coupled to the second end of the reverse-motion linkage arm and to the crank-arm on the spoiler aft-section.

20 Claims, 8 Drawing Sheets

MULTI-SECTION SPOILER

FIELD OF THE DISCLOSURE

The present disclosure is generally related to an aircraft spoiler with multiple sections.

BACKGROUND

An aircraft spoiler is a device that includes a surface that can be extended upward into airflow over a wing to reduce lift. Many aircraft include spoilers that can be deployed during descent to increase a rate of descent of the aircraft without increasing the aircraft's speed. Spoilers are often also deployed upon landing to provide a downward force to assist with braking.

Although spoilers have traditionally been configured to be deployed upward in order to decrease lift, some aircraft have spoilers that are also configured to be deployable in a "droop" configuration. In such aircraft, when flaps of an aircraft are extended to increase lift, spoilers adjacent to the flaps can also be deployed in the droop configuration (e.g., rotated downward toward the flaps) in order to improve airflow characteristics over the wing (e.g., to provide a smoother overall wing camber).

SUMMARY

In a particular implementation, a spoiler mechanism for an aircraft includes a spoiler fore-section, a spoiler aft-section, and a reverse-motion linkage arm. The spoiler fore-section includes a forward end, a hinge end, an actuator coupling, and a pivot coupling to couple the forward end to a wing structure of an aircraft and to enable rotation of the spoiler fore-section relative to the wing structure. The spoiler aft-section includes a hinge portion pivotally coupled to the hinge end of the spoiler fore-section and includes a crank-arm proximate a lower side of a forward end of the spoiler aft-section. The reverse-motion linkage arm includes a first end, a second end, and a pivot point coupled to the forward end of the spoiler fore-section. The spoiler mechanism also includes a first linkage to couple the first end of the reverse-motion linkage arm to the wing structure and includes a second linkage coupled to the second end of the reverse-motion linkage arm and to the crank-arm on the spoiler aft-section. Rotation of the spoiler fore-section in a first rotational direction causes rotation of the reverse-motion linkage arm about the pivot point in a second rotational direction opposite the first rotational direction and applies a force to the crank-arm of the spoiler aft-section to cause rotation of the spoiler aft-section in the first rotational direction about the hinge portion.

In another particular implementation, an aircraft includes a wing structure coupled to a flap and to a spoiler mechanism, an actuator coupled to the wing structure, and the spoiler mechanism. The spoiler mechanism includes spoiler fore-section, a spoiler aft-section, and a reverse-motion linkage arm. The spoiler fore-section includes a forward end including a pivot coupling coupled the wing structure and enabling rotation of the spoiler fore-section relative to the wing structure. The spoiler fore-section also includes a hinge end and an actuator coupling coupled to the actuator. The spoiler aft-section includes a hinge portion pivotally coupled to the hinge end of the spoiler fore-section and includes a crank-arm. The reverse-motion linkage arm includes a first end, a second end, and a pivot point coupled to the forward end of the spoiler fore-section. The spoiler mechanism also includes a first linkage coupling the first end of the reverse-motion linkage arm to the wing structure and a second linkage coupling the second end of the reverse-motion linkage arm to the crank-arm on the spoiler aft-section.

In another particular implementation, a method of controlling a spoiler of an aircraft is described. The method includes, responsive to movement of an actuator, rotating a spoiler fore-section in a first rotational direction about a pivot coupling at a forward end of the spoiler fore-section. Rotation of the spoiler fore-section moves a hinge end of the spoiler fore-section to cause the spoiler fore-section to have a first angle relative to a bulk airflow direction associated with a wing structure. The method also includes, responsive to rotation of the spoiler fore-section in the first rotational direction, applying a first force, via a first linkage, to a reverse-motion linkage arm coupled to the forward end of the spoiler fore-section to cause rotation of the reverse-motion linkage arm in a second rotational direction opposite the first rotational direction. The method further includes, responsive to rotation of the reverse-motion linkage arm in the second rotational direction, applying a second force, via a second linkage, to a crank-arm coupled to a hinge portion of a spoiler aft-section that is coupled to the hinge end of the spoiler fore-section. The method also includes, responsive to the second force, rotating the spoiler aft-section in the first rotational direction about the hinge portion of the spoiler aft-section.

DETAILED DESCRIPTION

Figure 1:
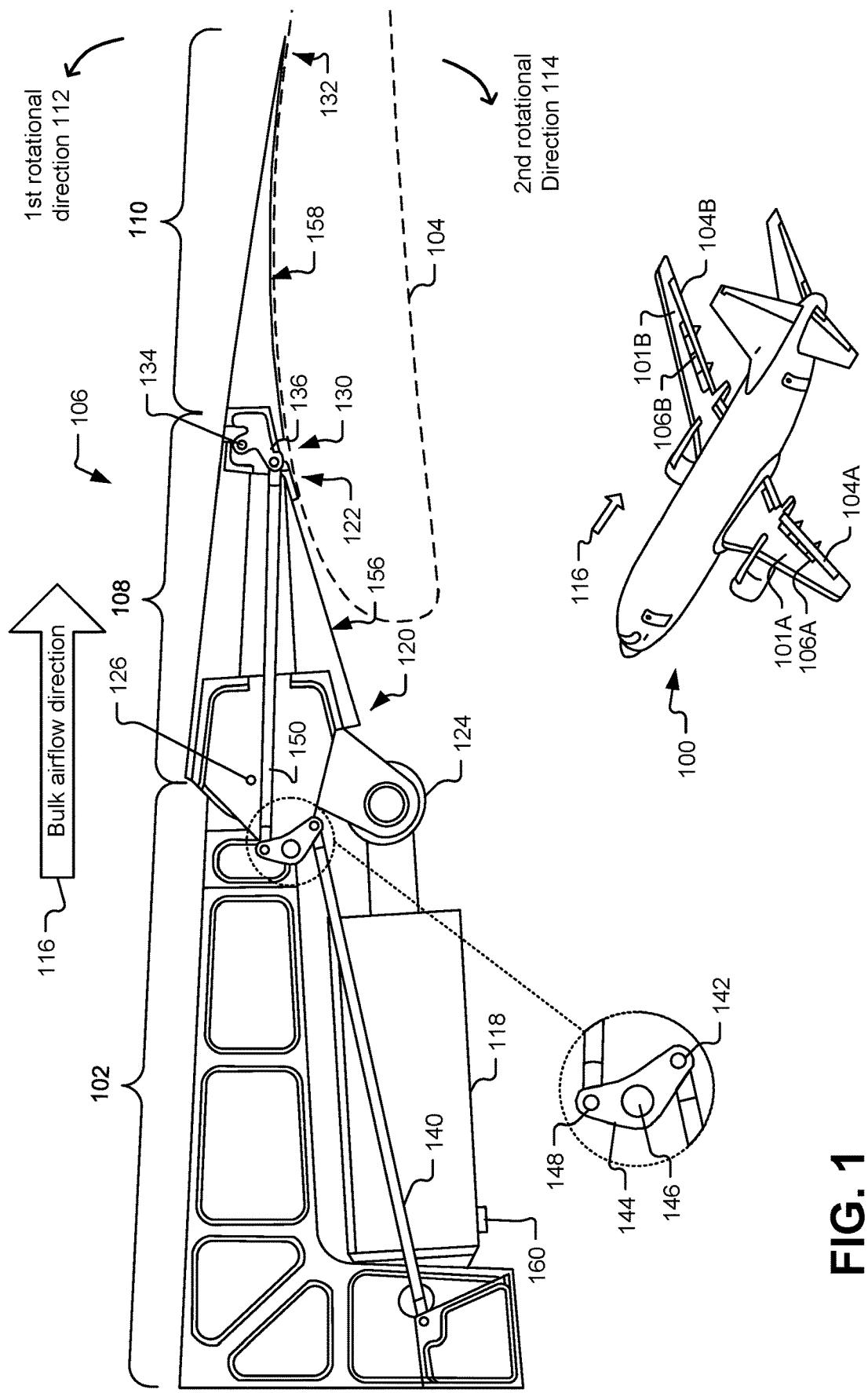
FIG. 1 is a diagram that illustrates an example of an aircraft and details of a spoiler mechanism according to a particular implementation.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, an aircraft 100 is illustrated and includes multiple flaps 104A and 104B. When referring to a particular one of these flaps, such as the flap 104A, the distinguishing letter "A" is used. However, when referring to any arbitrary one of these flaps or to these flaps as a group, the reference number 104 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority, order, or position of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

In some aircraft, space within wings, e.g., for equipment, structural support, control surface mechanisms, etc., can be quite crowded. Accordingly, it is challenging to design equipment to be housed within the wings. For example, including a spoiler that can be deployed both upward into a bulk airflow as well as downward in a droop configuration requires that an actuation mechanism for the spoiler be sized and positioned to enable both the upward movement and the downward movement. One way to accomplish this is to use an actuator that has a relatively long stroke length to enable both the upward and the downward movement, but assuming no other changes, an actuator with a longer stroke length is bigger than an actuator with a smaller stroke length. Accordingly, an actuator that has a stroke length sized to enable both the upward and the downward movement may be larger than an actuator with a shorter stroke length sized only to enable upward movement.

Accommodating a spoiler that can deploy in a droop configuration is associated with other design challenges as well. To illustrate, in some circumstances, a flap that is being retracted can impact a spoiler that is deployed in the droop configuration. For example, if an actuator of the spoiler experiences a fault, the retracting flap can come into contact with a trailing edge of the spoiler. This scenario is referred to as a "backdrive" condition. Spoiler and flap systems are designed to withstand backdrive conditions; however, some design features of the spoiler and flap system to account for backdrive conditions can add significant weight to the aircraft. For example, a flap actuator can be oversized to ensure that the flap actuator is able to move the flap into a non-deployed position even if the spoiler experiences a fault while in the droop configuration. To account for this circumstance, the flap actuator has to be more robust (and therefore heavier) than a flap actuator that is not sized to account for a backdrive condition. As another example, the trailing edge of the spoiler can be reinforced or strengthened (which adds weight) to withstand forces applied by the flap when the flap retracts in a backdrive condition. Even with such reinforcement, the trailing edge of the spoiler can be damaged by retraction of the flap, requiring replacement before subsequent flights, decreasing availability of the aircraft, and increasing the cost for the aircraft operator.

Disclosed herein is a space-efficient spoiler mechanism that is deployable upward (e.g., to decrease lift or for roll control) and downward (in a droop configuration). The spoiler mechanism includes multiple segment that are arranged to use mechanical advantage such that a relatively short stroke length actuator is sufficient to move the spoiler throughout its entire range of motion (e.g., from a fully upward position to a fully downward position). Additionally, the multiple segments are configured to accommodate a backdrive condition without dramatically increasing the reinforcement of the trailing edge of the spoiler. The overall weight and dimensions of the spoiler mechanism are reduced (as compared to, for example, a conventional spoiler system that is capable of drooping) due to the use of a smaller actuator, due to decreased reinforcement of the spoiler trailing edge, or both. Additionally, as compared to a single panel spoiler, the multiple segments of the spoiler mechanism provide a more gradual camber of the wing while in the drooped configuration, which improves aerodynamic performance of the wing/spoiler system as a result of decreased boundary layer separation of airflow over the wing. Further, as compared to a single panel spoiler, the multiple segments of the spoiler mechanism may be simpler to manufacture. For example, an angle at which the segments of the spoiler mechanism meet can be configured (e.g., sized, shaped, and/or positioned) to accommodate an flap, which enables the segments of the spoiler mechanism to have flat lower surfaces, in contrast to a lower surface of a single panel spoiler, which may be curved to accommodate the flap. The flat lower surface is simpler to manufacture than a curved lower surface.

FIG. 1 is a diagram that illustrates an example of an aircraft 100 and details of a spoiler mechanism 106 of the aircraft 100 according to a particular implementation. The aircraft 100 includes wings 101 (including a port wing 101A and a starboard wing 101B), and each wing 101 includes one or more flaps 104. In FIG. 1, a spoiler mechanism 106 is positioned adjacent (e.g., forward of) to each flap 104. For example, a port-side spoiler mechanism 106A is adjacent to a port-side flap 104A, and a starboard-side spoiler mechanism 106B is adjacent to a starboard-side flap 104B. FIG. 1 also illustrates a bulk airflow direction 116 relative to the aircraft 100.

FIG. 1 also illustrates details of a spoiler mechanism 106 in relation to a flap 104. The spoiler mechanism 106 is coupled to a wing structure 102, such as a structural member of the wing 101. The spoiler mechanism 106 includes multiple segments, including a spoiler fore-section 108 and a spoiler aft-section 110. Rotation of the spoiler fore-section 108 and the spoiler aft-section 110 in a first rotational direction 112 from a neutral position (which is illustrated in FIG. 1) extends the spoiler fore-section 108 and the spoiler aft-section 110 into a bulk airflow to reduce lift generated by the wing 101. Rotation of the spoiler fore-section 108 and the spoiler aft-section 110 in a second rotational direction 114 from the neutral position extends the spoiler fore-section 108 and the spoiler aft-section 110 toward the flap 104. For example, when the flap 104 is in a deployed position relative to the wing structure 102 (e.g., as illustrated in FIG. 4D), the spoiler mechanism 106 can be deployed in a droop configuration.

The spoiler fore-section 108 has a forward end 120 and a hinge end 122. The forward end 120 of the spoiler fore-section 108 includes a pivot coupling 126 to couple the forward end 120 to the wing structure 102. The pivot coupling 126 enables rotation of the spoiler fore-section 108 relative to the wing structure 102. The forward end 120 of the spoiler fore-section 106 also includes an actuator coupling 124. The actuator coupling 124 is configured to couple to an actuator 118. The actuator 118 is coupled to the actuator coupling 124 and to the wing structure 102.

The spoiler fore-section 108 and the spoiler aft-section 110 are rotatable in the first rotational direction 112 from the neutral position responsive to extension of the actuator 118 and are rotatable in the second rotational direction 114 (opposite the first rotational direction 112) from the neutral position responsive to retraction of the actuator 118. For example, in FIG. 1, extension of the actuator 118 causes rotation of the spoiler fore-section 108 about the pivot coupling 126 in the first rotational direction 112 (e.g., an upward direction in the example illustrated in FIG. 1) and retraction of the actuator 118 causes rotation of the spoiler fore-section 108 about the pivot coupling 126 in the second rotational direction 114 (e.g., an downward direction in the example illustrated in FIG. 1). As explained further below, rotation of the spoiler fore-section 108 also causes an even greater degree of rotation of the spoiler aft-section 110.

The spoiler aft-section 110 includes a forward end 130 and a trailing edge 132. The forward end 130 includes a hinge portion 134 pivotally coupled to the hinge end 122 of the spoiler fore-section 108. The forward end 130 of the spoiler aft-section 110 includes or is coupled to a crank-arm 136. The crank-arm 136 is located proximate a lower side 158 of the forward end 130 of the spoiler aft-section 110.

The spoiler mechanism 106 also includes a reverse-motion linkage arm 144. The reverse-motion linkage arm 144 includes a first end 142, a second end 148, and a pivot point 146. The pivot point 146 is coupled to the forward end 120 of the spoiler fore-section 108. A first linkage 140 is coupled the first end 142 of the reverse-motion linkage arm 144 and to the wing structure 102. A second linkage 150 is coupled to the second end 148 of the reverse-motion linkage arm 144 and to the crank-arm 136 on the spoiler aft-section 110. The first linkage 140 and second linkage 150 are rigid members to withstand and transfer both tensile and compressive forces.

In the implementation illustrated in FIG. 1, the actuator 118 can be extended to deploy the spoiler mechanism 106 into airflow over the wing 101 (e.g., to decrease lift or for roll control), and the actuator 118 can be retracted to deploy the spoiler mechanism 106 in the droop configuration. As an example of deploying the spoiler mechanism 106 into the airflow, extension of the actuator 118 causes rotation of the spoiler fore-section 108 around the pivot coupling 126 in the first rotational direction 112. The extension of the actuator 118 also applies a force to the first linkage 140 which causes rotation of the reverse-motion linkage arm 144 about the pivot point 146 in the second rotational direction 114. The rotation of the reverse-motion linkage arm 144 about the pivot point 146 in the second rotational direction 114 causes the second linkage 150 to apply a force to the crank-arm 136 of the spoiler aft-section 110, which causes rotation of the spoiler aft-section 110 in the first rotational direction 112 about the hinge portion 134.

For example, extension of the actuator 118 moves the spoiler fore-section 108 and the reverse-motion linkage arm 144 relative to the wing structure 102. The spoiler aft-section 110 moves with the spoiler fore-section 108 because the spoiler aft-section 110 is coupled to the hinge end 122 of the spoiler fore-section 108. Additionally, movement of the reverse-motion linkage arm 144 relative to the wing structure 102 produces a force that is applied in a forward direction via the first linkage 140 to the first end 142 of the reverse-motion linkage arm 144. The force applied to the first end 142 of the reverse-motion linkage arm 144 rotates the reverse-motion linkage arm 144 and causes an aft-direction force to be applied by the second end 148 of the reverse-motion linkage arm 144 to the second linkage 150 to displace the crank-arm 136 on the spoiler aft-section 110. Displacement of the crank-arm 136 causes rotation of the spoiler aft-section 110 about the hinge portion 134. Thus, extension of the actuator 118 causes the spoiler fore-section 108 to rotate about the pivot coupling 126 and causes the spoiler aft-section 110 to rotate about the pivot coupling 126 and about the hinge portion 134.

As an example of deploying the spoiler mechanism 106 into the droop configuration, retraction of the actuator 118 causes rotation of the spoiler fore-section 108 around the pivot coupling 126 in the second rotational direction 114. The retraction of the actuator 118 also applies a force to the first linkage 140 which causes rotation of the reverse-motion linkage arm 144 about the pivot point 146 in the first rotational direction 112. The rotation of the reverse-motion linkage arm 144 about the pivot point 146 in the first rotational direction 112 causes the second linkage 150 to apply a force to the crank-arm 136 of the spoiler aft-section 110, which causes rotation of the spoiler aft-section 110 in the second rotational direction 114 about the hinge portion 134. Thus, retraction of the actuator 118 causes the spoiler fore-section 108 to rotate about the pivot coupling 126 and causes the spoiler aft-section to rotate about the pivot coupling 126 and about the hinge portion 134.

The spoiler mechanism 106 uses mechanical advantage provided by a mechanical advantage assembly (including the reverse-motion linkage arm 144, the first and second linkages 140, 150, and the crank-arm 136) to magnify the effect of motion of the actuator 118. Stated another way, for each unit of extension (e.g., for each inch of extension) of the actuator 118, the spoiler fore-section 108 rotates relative to the wing structure 102 a corresponding number of degrees around the pivot coupling 126. The spoiler aft-section 110 rotates the same number of degrees relative to the wing structure 102 around the pivot coupling 126 because the spoiler aft-section 110 is physically coupled to the hinge end 122 of the spoiler fore-section 108. Additionally, the mechanical advantage assembly causes the spoiler aft-section 110 to rotate relative to the spoiler fore-section 108 an additional number of degrees around the hinge portion 134. As a result, the spoiler aft-section 110 experiences greater angular displacement relative to the wing structure 102 than does the spoiler fore-section 108.

To illustrate, when the spoiler fore-section 108 is rotated upward to a first angle (e.g., at least five degrees relative to the bulk airflow direction 116), the spoiler aft-section 110 is rotated upward to a second angle that is greater than the first angle. In some implementations, the spoiler fore-section 108 is rotatable up to a first angle of no more than 40 degrees relative to the bulk airflow direction 116, and the spoiler aft-section 110 is rotatable up to a second angle of at least 80 degrees relative to the bulk airflow direction 116. Further, in some implementations, the spoiler aft-section 110 is rotatable up to an angle of greater than or equal to 80 degrees relative to the bulk airflow direction 116 responsive to an actuator extension of the actuator 118 of less than or equal to 3 inches. Thus, the actuator 118 can have a relatively short stroke length while enabling full deployment of the spoiler mechanism 106 into the airflow or into the droop configuration. For example, a conventional spoiler system may use an actuator that has a stroke length of greater than or equal to 5 inches in order to enable full deployment of the spoiler into the airflow or into the droop configuration.

In some implementations, the spoiler fore-section 108, the spoiler aft-section 110, or both, can have a flat lower surface, which simplifies manufacturing. For example, in FIG. 1, a lower side 156 of the spoiler fore-section 108 is substantially flat and a lower side 158 of the spoiler aft-section 110 is curved. In other implementations, a clearance distance between the lower side 158 of the spoiler aft-section 110 and the flap 104 can be increased slightly to allow the lower side 158 of the spoiler aft-section 110 to have a substantially flat surface, which is simpler and less expensive to manufacture than the curved lower surface used on many single panel spoilers.

Figure 2A:
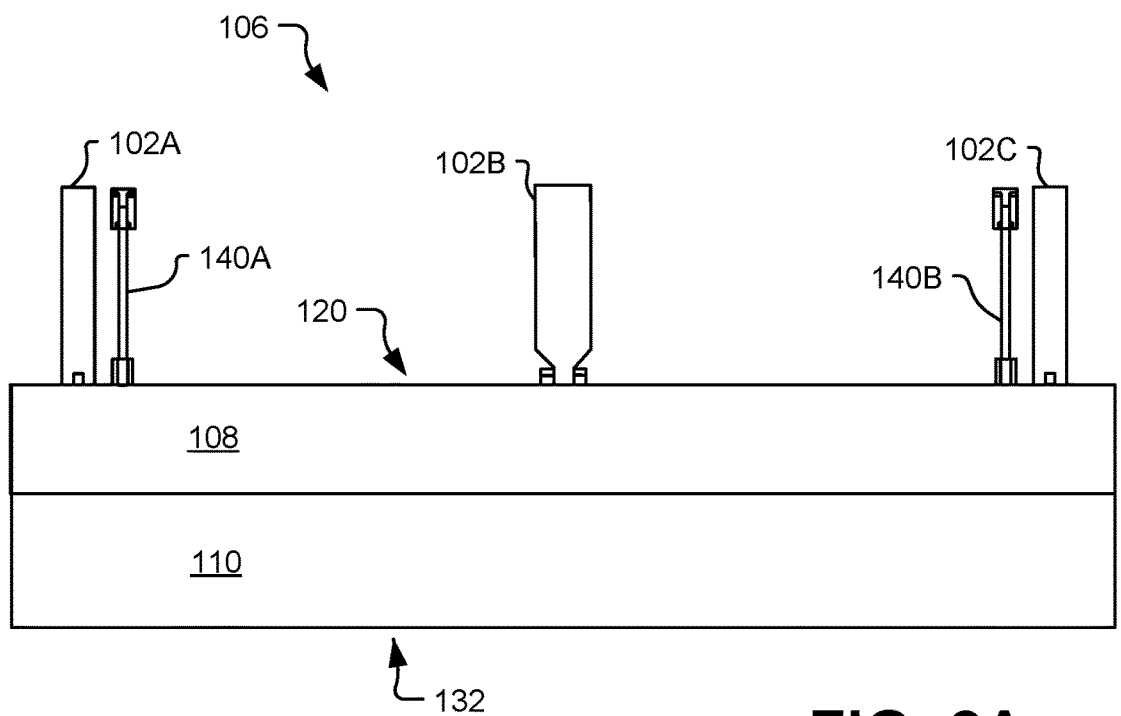
FIG. 2A is a diagram that illustrates an example of a top view of the spoiler mechanism of FIG. 1.
Figure 2B:
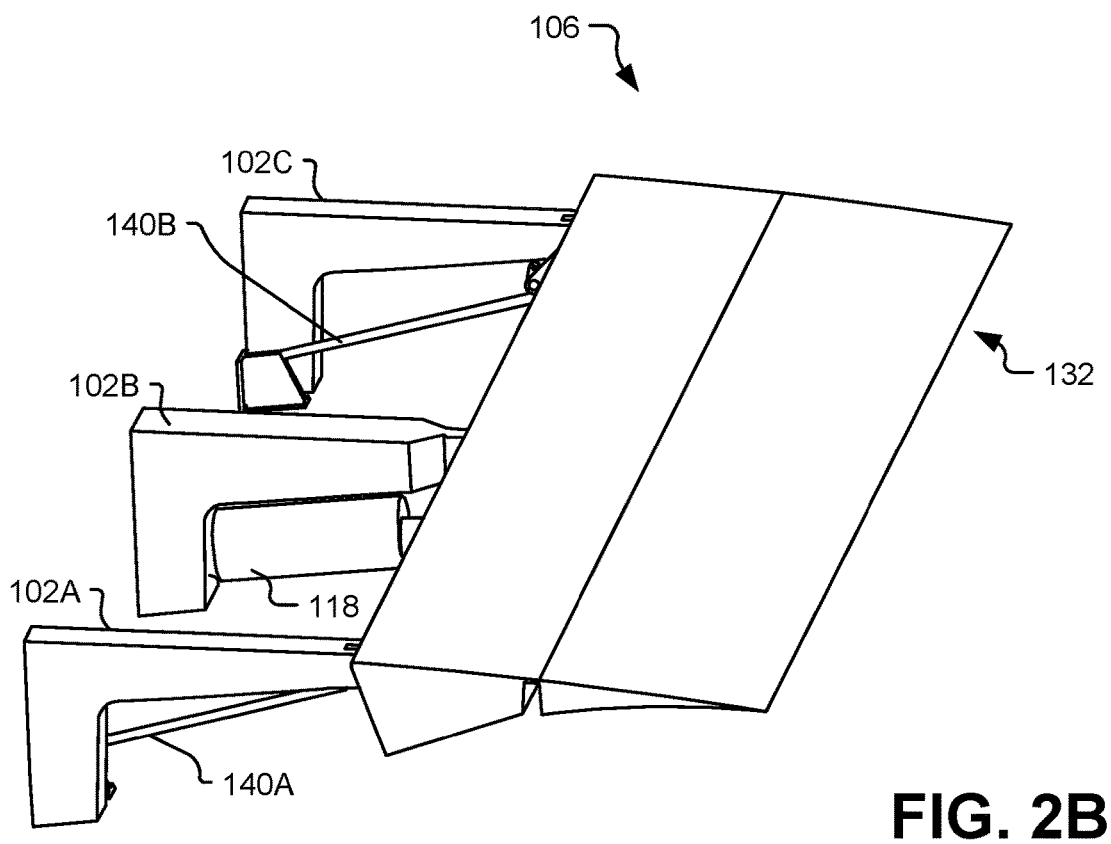
FIG. 2B is a diagram that illustrates an example of a perspective side view of the spoiler mechanism of FIG. 1.
Figure 2C:
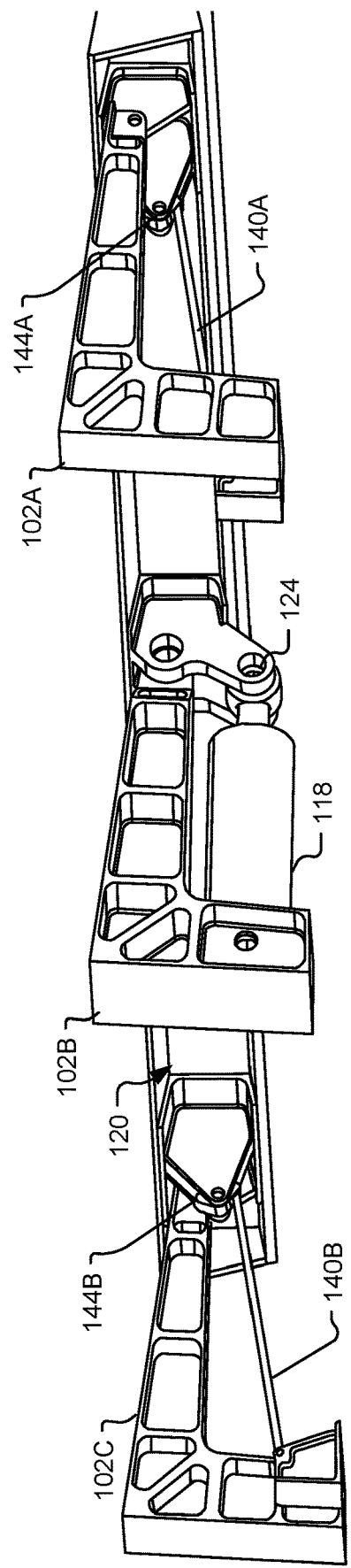
FIG. 2C is a diagram that illustrates an example of a perspective fore-end view of the spoiler mechanism of FIG. 1.

FIG. 2A is a diagram that illustrates an example of a top view of the spoiler mechanism 106 of FIG. 1, FIG. 2B is a diagram that illustrates an example of a perspective side view of the spoiler mechanism 106 of FIG. 1, and FIG. 2C is a diagram that illustrates an example of a perspective fore-end view of the spoiler mechanism 106 of FIG. 1. In FIGS. 2A-2C, the spoiler mechanism 106 is coupled to three wing structures, including a first wing structure 102A, a second wing structure 102B, and a third wing structure 102C. In this example, the actuator 118 is coupled to the spoiler fore-section 108 and to the second wing structure 102B. In other examples, the actuator 118 can be coupled to the first wing structure 102A or the third wing structure 102C. In yet other examples, the spoiler mechanism 106 can include more than one actuator 118, in which case the actuators 118 can be coupled to more than one of the wing structures 102.

In FIGS. 2A-2C, the spoiler mechanism 106 includes more than one mechanical advantage assembly (e.g., more than one reverse-motion linkage arm 144, more than one first linkage 140, more than one second linkage 150, and more than one crank-arm 136). For example, FIGS. 2A-2C illustrate two first linkages 140A and 140B. Additionally, FIG. 2C illustrates two reverse-motion linkage arms 144A and 144B.

Figure 3A:
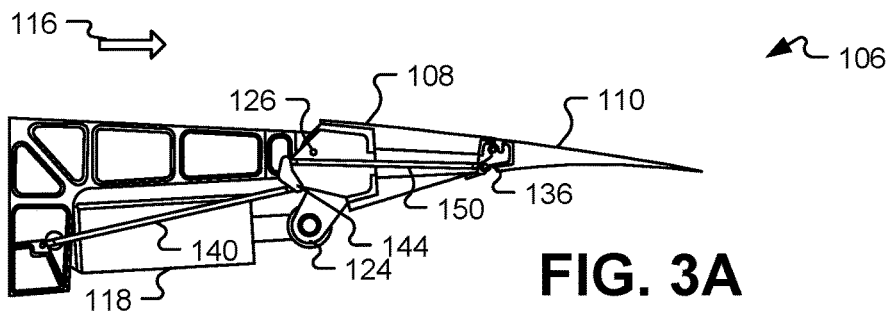
FIGS. 3A, 3B, 3C, 3D, and 3E are diagrams that together illustrate an example of stages of deployment of the spoiler mechanism of FIG. 1 in an upward direction.
Figure 3B:
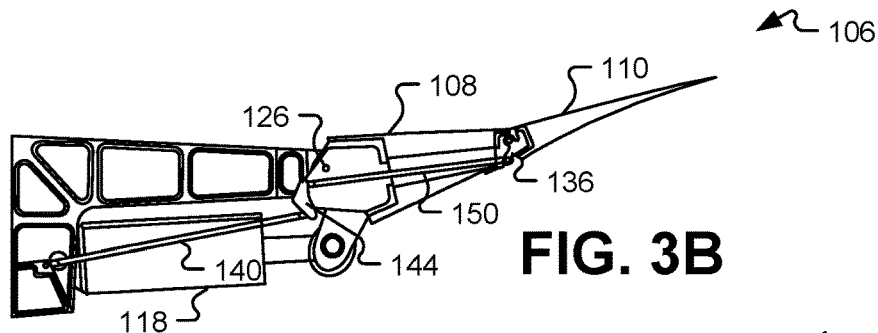

FIGS. 3A, 3B, 3C, 3D, and 3E are diagrams that illustrate examples of stages of deployment of the spoiler mechanism 106 of FIG. 1 in an upward direction. FIG. 3A illustrates a first stage (e.g., a non-deployed state) in which the spoiler mechanism 106 is in the neutral configuration substantially identical to the spoiler mechanism 106 as illustrated in FIG. 1. FIG. 3B illustrates a second stage of deployment of the spoiler mechanism 106 in the upward direction from the neutral position of FIG. 3A. As compared to FIG. 3A, in FIG. 3B, the actuator 118 is slightly extended, the spoiler fore-section 108 and spoiler aft-section 110 are rotated in a counter-clockwise rotational direction around the pivot coupling 126, the reverse-motion linkage arm 144 is rotated around the pivot point 146 in a clockwise rotational direction, and the spoiler aft-section 110 and crank-arm 136 are rotated in the counter-clockwise rotational direction around the hinge portion 134. As a result, the spoiler aft-section 110 is rotated at a steeper angle relative to the neutral position than is the spoiler fore-section 108.

Figure 3C:
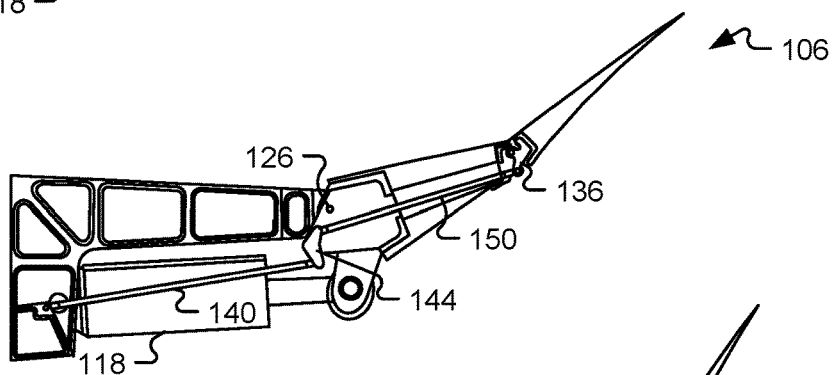
Figure 3D:
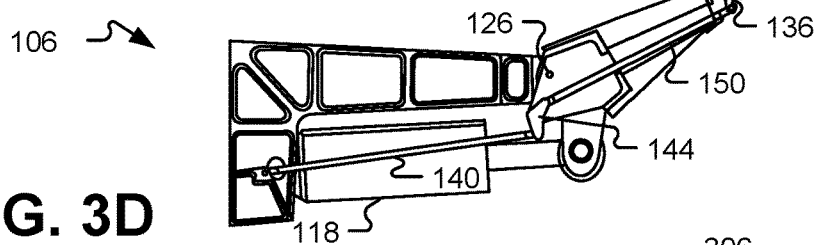
Figure 3E:
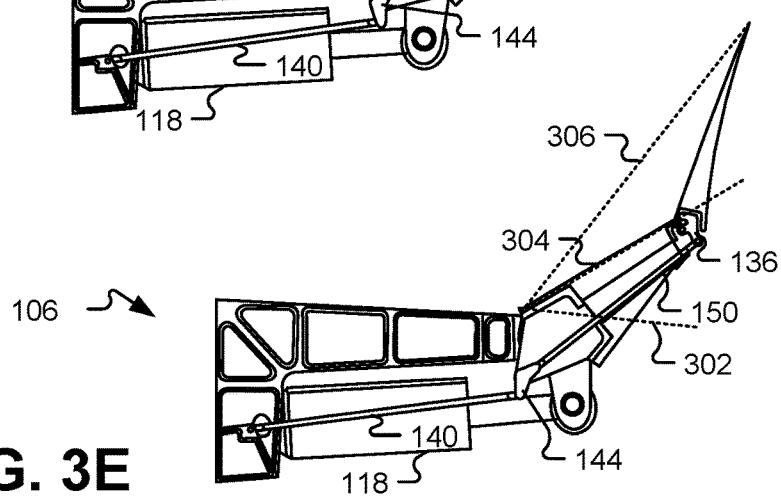

FIG. 3C illustrates a third stage of deployment of the spoiler mechanism 106, FIG. 3D illustrates a fourth stage of deployment of the spoiler mechanism 106, and FIG. 3E illustrates a fifth stage of deployment of the spoiler mechanism 106. During deployment of the spoiler mechanism 106 in the upward direction from the neutral position, the second stage is subsequent to the first stage, the third stage is subsequent to the second stage, the fourth stage is subsequent to the third stage, and the fifth stage is subsequent to the fourth stage. During retraction of the spoiler mechanism, the order of the stages is reversed (e.g., from the fifth stage to the first stage).

As compared to the second stage of FIG. 3B, in the third stage, the actuator 118 is further extended, the spoiler fore-section 108 and spoiler aft-section 110 are further rotated in the counter-clockwise rotational direction around the pivot coupling 126, the reverse-motion linkage arm 144 is further rotated around the pivot point 146 in the clockwise rotational direction, and the spoiler aft-section 110 and crank-arm 136 are further rotated in the counter-clockwise rotational direction around the hinge portion 134. The third stage of FIG. 3C differs from the second stage in a similar manner to the manner in which the second stage differs from the first stage. The fourth stage of FIG. 3D differs from the third stage and the fifth stage differs from the fourth stage in a similar manner.

The fifth stage of FIG. 3E corresponds to the spoiler mechanism 106 being fully deployed in the upward direction (also referred to herein as a braking configuration, as distinct from a droop configuration). Lines 302, 304, and 306 are shown to illustrate angular differences in various components in the fully deployed position. Line 302 illustrates an approximate position of an upper surface of the spoiler fore-section 108 in the neutral position. Line 304 illustrates the position of the upper surface of the spoiler fore-section 108 in the fully deployed position, and line 306 illustrates a line extending approximately from a forward end of the upper surface of the spoiler fore-section 108 to a trailing edge of the spoiler aft-section 110. An angle between the line 302 and the line 304 corresponds to a deployment angle of the spoiler fore-section 108. An angle between the line 302 and the line 306 corresponds to a deployment angle of the spoiler aft-section 110. It should be noted that FIGS. 3A-3E are merely illustrative and are not necessarily to scale. For example, in FIG. 3E, the fully deployed angle of the spoiler fore-section 108 is shown as about 40 degrees, and the fully deployed angle of the spoiler aft-section 110 is shown as about 60 degrees. However, in other implementations, the fully deployed angle of the spoiler fore-section 108 can be greater than 40 degrees or less than 40 degrees. Likewise, in other implementations, the fully deployed angle of the spoiler aft-section 110 can be greater than 60 degrees or less than 60 degrees. Additionally, a relationship between the fully deployed angle of the spoiler fore-section 108 and the fully deployed angle of the spoiler aft-section 110 can be different than illustrated. To illustrate, by changing the mechanical advantage assembly (such as by changing locations of axes about which various components rotate, changing lengths of arms or linkages, or both) the spoiler aft-section 110 can be caused to rotate more than is illustrated in FIG. 3E relative to the spoiler fore-section 108 or to rotate less relative to the spoiler fore-section 108 than illustrated in FIG. 3E. In each implementation, however, the spoiler aft-section 110 rotates more than the spoiler fore-section 108 due to the mechanical advantage provided by the mechanical advantage assembly.

Figure 4A:
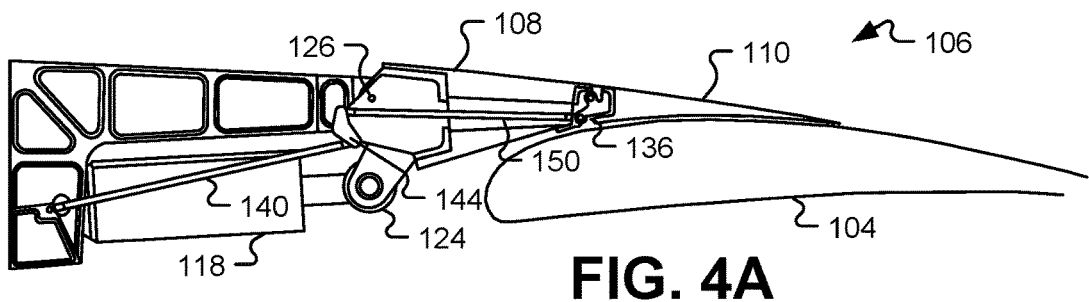
FIGS. 4A, 4B, 4C, and 4D are diagrams that together illustrate an example of stages of deployment of the spoiler mechanism of FIG. 1 in a downward direction.
Figure 4B:
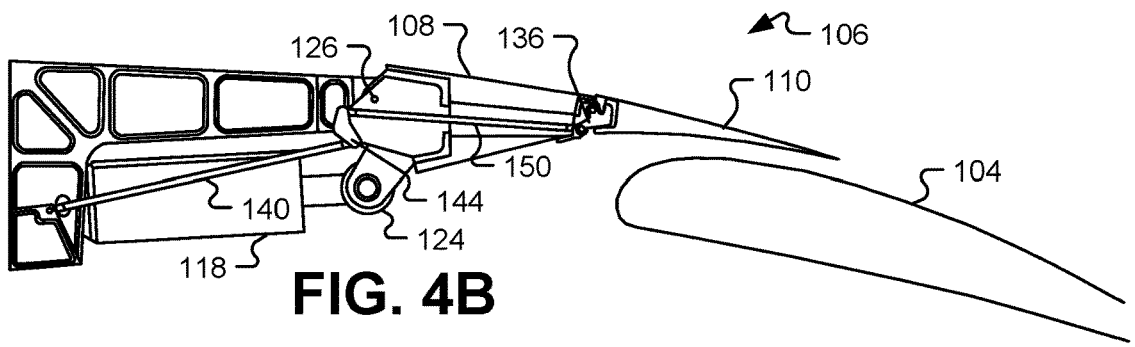
Figure 4C:
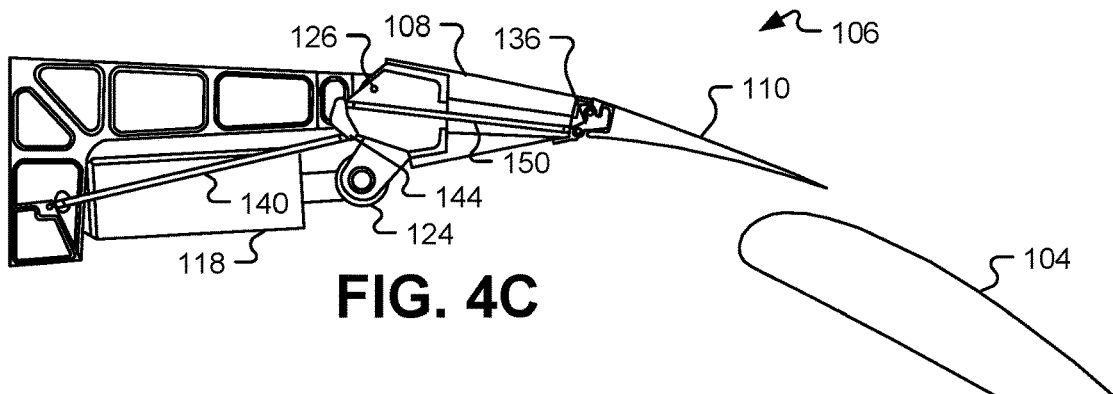
Figure 4D:
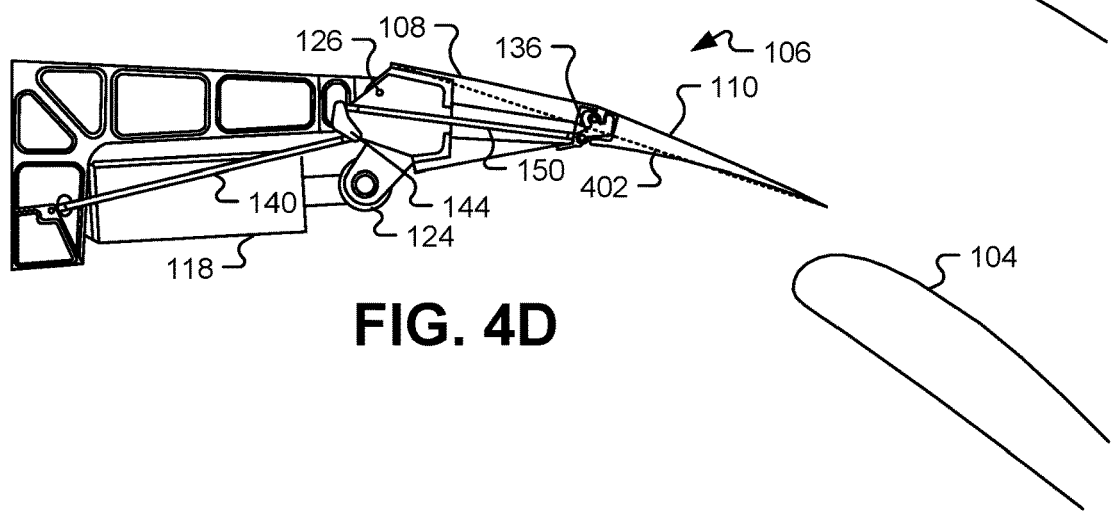

FIGS. 4A, 4B, 4C, and 4D are diagrams that illustrate an examples of stages of deployment of the spoiler mechanism of FIG. 1 in a downward direction. FIG. 4A illustrates a first stage (e.g., a non-deployed state) in which the spoiler mechanism 106 and the flap 104 are in the neutral configuration substantially identical to the spoiler mechanism 106 as illustrated in FIG. 1. FIG. 4B illustrates a second stage of deployment of the spoiler mechanism 106 in the downward direction (toward the droop configuration) from the neutral position of FIG. 4A. FIG. 4B also illustrates the flap 104 moving downward from the neutral position toward a deployed position. As compared to FIG. 4A, in FIG. 4B, the actuator 118 is slightly retracted, the spoiler fore-section 108 and spoiler aft-section 110 are rotated in a clockwise rotational direction around the pivot coupling 126, the reverse-motion linkage arm 144 is rotated around the pivot point 146 in a counter-clockwise rotational direction, and the spoiler aft-section 110 and crank-arm 136 are rotated slightly in the clockwise rotational direction around the hinge portion 134. As a result, the spoiler aft-section 110 is rotated at a somewhat steeper angle relative to the neutral position that is the spoiler fore-section 108.

FIG. 4C illustrates a third stage of deployment of the spoiler mechanism 106, and FIG. 4D illustrates a fourth stage of deployment of the spoiler mechanism 106. During deployment of the spoiler mechanism 106 in the downward direction from the neutral position, the second stage is subsequent to the first stage, the third stage is subsequent to the second stage, and the fourth stage is subsequent to the third stage. During retraction of the spoiler mechanism back to the neutral position, the order of the stages is reversed (e.g., from the fourth stage to the first stage).

As compared to the second stage of FIG. 4B, in the third stage, the actuator 118 is further retracted, the spoiler fore-section 108 and spoiler aft-section 110 are further rotated in the clockwise rotational direction around the pivot coupling 126, the reverse-motion linkage arm 144 is further rotated around the pivot point 146 in the counter-clockwise rotational direction, and the spoiler aft-section 110 and crank-arm 136 are further rotated in the clockwise rotational direction around the hinge portion 134. The fourth stage of FIG. 4D differs from the third stage in a similar manner to the manner in which the third stage differs from the second stage.

In FIG. 4D, a line 402 illustrates, for comparison purposes, an approximate position of an upper surface of a single panel spoiler when in the droop configuration. As illustrated in FIG. 4D, the upper surfaces of the spoiler fore-section 108 and the spoiler aft-section 110 provide a smoother camber than a camber of the line 402. Thus, in the droop configuration, the spoiler mechanism 106 provides improved airflow characteristics over the wing relative to the single panel spoiler.

A backdrive condition can occur if the actuator 118 experiences a fault while the flap 104 is deployed and the spoiler mechanism 106 is deployed in the droop configuration, as illustrated in FIG. 4D. In this circumstance, the flap 104 is retracted (by a flap actuator, which is not shown) until the flap 104 contacts a portion of the spoiler mechanism 106, typically at or near the trailing edge of the spoiler mechanism 106. The flap actuator is sized to enable the flap 104 to retract with sufficient force to overcome a pressure valve 160 (shown in FIG. 1) of the spoiler mechanism 106. When the pressure valve 160 is overcome, the flap 104 pushes the spoiler mechanism 106 back toward the neutral position as the flap 104 retracts, extending the actuator 118.

In some circumstances, the portion of the spoiler mechanism 106 that contacts the flap 104 can be damaged by the force applied by the flap 104 as it retracts. In a particular implementation, the spoiler aft-section 110 can be configured to respond to contact with the flap 104 in a manner that is resettable. For example, one or more of the linkages 140, 150, the reverse-motion linkage arm 144, or the crank-arm 136 can slip, separate or detach to allow the spoiler aft-section 110 to move upward due to force applied by the flap 104. If the actuator is inoperable such that the spoiler mechanism 106 does not cause upward rotation of the spoiler, the one or more linkages can slip or separate at a location that prevents portions of the particular component from interfering with movement of other components (e.g., during flight) or causing less than optimal operation, and in a manner that is easily repaired or replaced (e.g., after the flight). Thus, the spoiler mechanism 106 enables simple recovery from the backdrive condition without damaging portions of the spoiler mechanism 106 that are expensive and/or difficult to replace, such as the spoiler aft-section 110. Additionally, the weight of the spoiler mechanism 106 can be reduced (relative to a single panel spoiler) since the trailing edge of the spoiler mechanism 106 does need to be significantly reinforced to withstand forces applied by the flap 104 in the backdrive condition.

Figure 5:
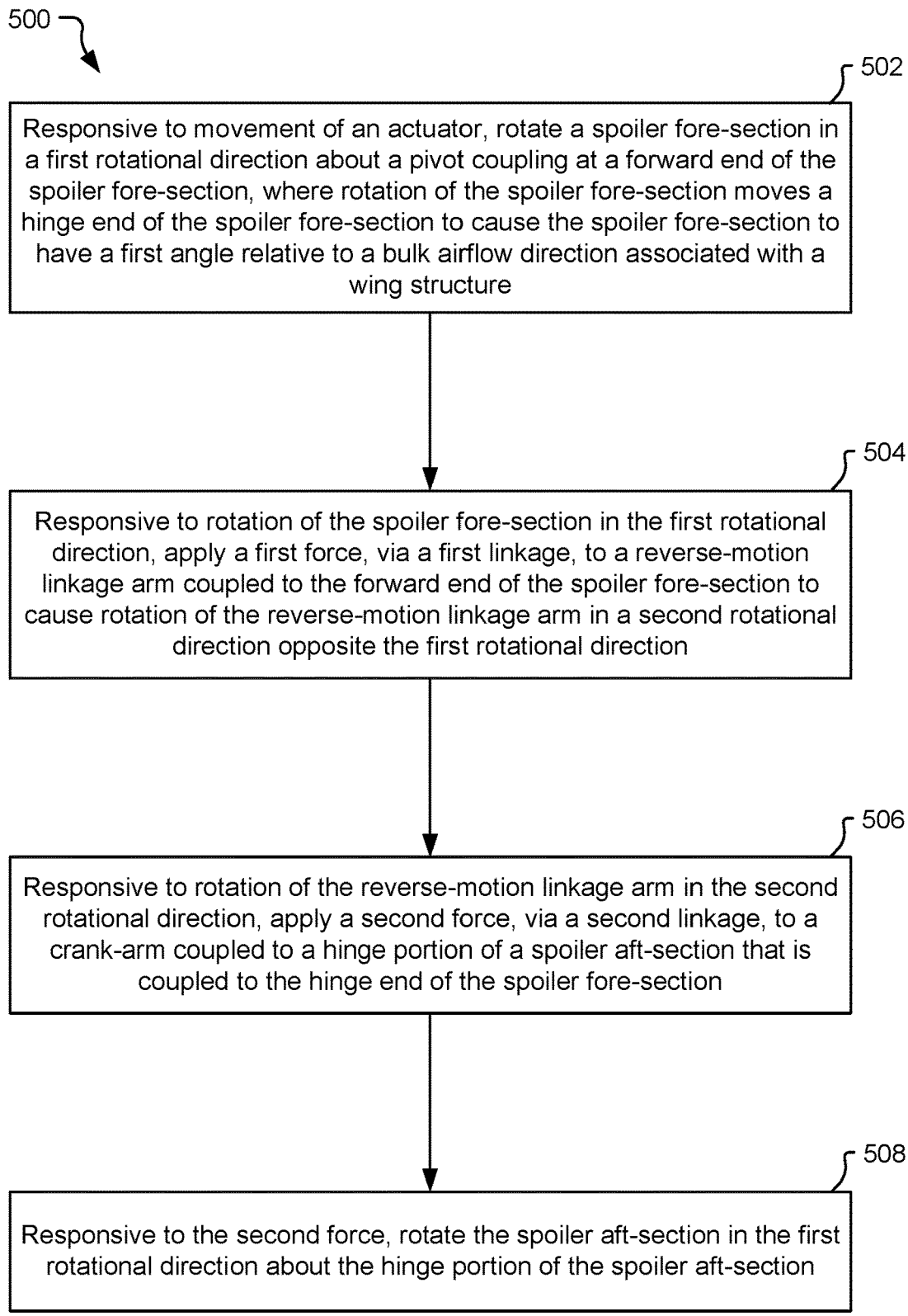
FIG. 5 is a flow chart of an example of a method of controlling a spoiler of an aircraft.

FIG. 5 is a flow chart of an example of a method 500 of controlling a spoiler of an aircraft, such as the aircraft 100. The method 500 can be performed by the spoiler mechanism 106, e.g., responsive to a control input from a pilot or aircraft control computer, such as a flight control computer.

The method 500 includes, at 502, responsive to movement of the actuator 118, rotating the spoiler fore-section 108 in a first rotational direction (e.g. clock-wise or counter clock-wise) about the pivot coupling 126 at the forward end 120 of the spoiler fore-section 108. Rotation of the spoiler fore-section 108 moves the hinge end 122 of the spoiler fore-section 108 to cause the spoiler fore-section 108 to have a first angle relative to the bulk airflow direction 116 associated with the wing structure 102. In a first example, the movement of the actuator 118 is an extension of the actuator 118, and the spoiler fore-section 108 moves upward into the bulk airflow over the wing structure 102. In a second example, the movement of the actuator 118 is a retraction of the actuator 118, and the spoiler fore-section 108 moves downward toward a droop configuration.

The method 500 includes, at 504, responsive to rotation of the spoiler fore-section 108 in the first rotational direction, applying a first force, via the first linkage 140, to the reverse-motion linkage arm 144 coupled to the forward end 120 of the spoiler fore-section 108 to cause rotation of the reverse-motion linkage arm 144 in a second rotational direction opposite the first rotational direction. For example, if the spoiler fore-section 108 rotates in a counter-clockwise direction, the reverse-motion linkage arm 144 rotates in a clockwise direction. Likewise, if the spoiler fore-section 108 rotates in a clockwise direction, the reverse-motion linkage arm 144 rotates in a counter-clockwise direction.

The method 500 also includes, at 506, responsive to rotation of the reverse-motion linkage arm 144 in the second rotational direction, applying a second force, via the second linkage 150, to the crank-arm 136 coupled to the hinge portion 134 of the spoiler aft-section 110, which is coupled to the hinge end 122 of the spoiler fore-section 108. The method 500 further includes, at 508, responsive to the second force, rotating the spoiler aft-section 110 in the first rotational direction about the hinge portion 134 of the spoiler aft-section 110.

In a particular implementation of the method 500 and the spoiler mechanism 106, the movement of the actuator 118 includes an extension of the actuator 118 by less than or equal to 3 inches and the resulting rotation of the spoiler aft-section 110 is to an angle of greater than or equal to 80 degrees relative to the bulk airflow direction 116. In some implementations, the spoiler fore-section 108 is rotated to a first angle of no more than 40 degrees relative to the bulk airflow direction 116 when the spoiler aft-section 110 is rotated to a second angle of at least 80 degrees relative to the bulk airflow direction. In another implementation of the method 500 and the spoiler mechanism 106, the movement of the actuator 118 includes a retraction of the actuator 118 to deploy the spoiler fore-section 108 and the spoiler aft-section 110 in a droop configuration.

Figure 6:
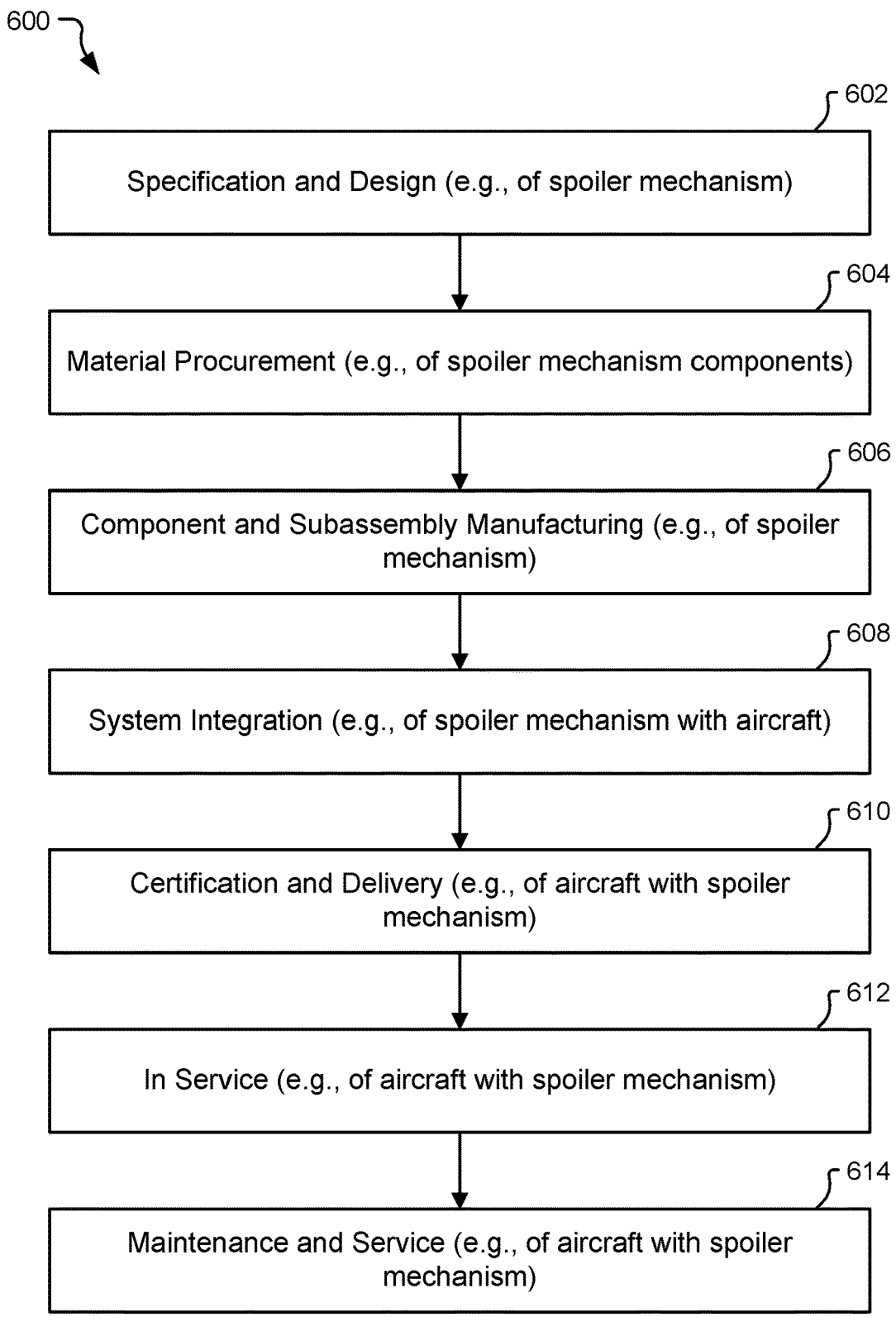
FIG. 6 is a flow chart of an example of a method associated with a life cycle of the aircraft of FIG. 1.

FIG. 6 is a flow chart of an example of a method 600 associated with a life cycle of the aircraft 100 of FIG. 1. During the life cycle of the aircraft 100, the spoiler mechanism 106 can be added to the aircraft 100 (e.g., via retrofit or upgrade) or the aircraft 100 can be designed and built initially with the spoiler mechanism 106. In FIG. 6, during pre-production, the method 600 includes, at 602, specification and design of the aircraft 100. During the specification and design of the aircraft 100, the method 600 can include specifying the spoiler mechanism 106 or components of the spoiler mechanism 106. At 604, the method 600 includes material procurement. For example, the method 600 can include procuring materials for the spoiler mechanism 106 (such as materials for the spoiler fore-section 108, the spoiler aft-section 110, the linkages 140, 150, the actuator 118, the reverse-motion linkage arm 144, the crank-arm 136, etc.).

During production, the method 600 includes, at 606, component and subassembly manufacturing and, at 608, system integration of the aircraft 100. In a particular implementation, the component and subassembly manufacturing, at 606, includes manufacturing the spoiler mechanism 106 or components of the spoiler mechanism 106. Likewise, the system integration, at 608, includes coupling the spoiler mechanism 106 or components of the spoiler mechanism 106 to other components and controllers of the aircraft 100.

At 610, the method 600 includes certification and delivery of the aircraft 100 and, at 612, placing the aircraft 100 in service. In some implementations, certification and delivery includes certifying the spoiler mechanism 106 or a spoiler/flap assembly that includes the spoiler mechanism 106. Placing the vehicle in service can also include placing the spoiler mechanism 106 in service. While in service by a customer, the aircraft 100 may be scheduled for routine maintenance and service (which can also include modification, reconfiguration, refurbishment, and so on). At 614, the method 600 includes performing maintenance and service on the aircraft 100. In a particular implementation, the method 600 includes performing maintenance and service on the spoiler mechanism 106. For example, the maintenance and service of the spoiler mechanism 106 can include replacing or repairing a component subsequent to a back-drive condition. In a particular implementation, the maintenance and service on the aircraft 100 can include replacing a single panel spoiler mechanism with the spoiler mechanism 106.

Each of the processes of the method 600 is performed or carried out by a system integrator, a third party, and/or an operator (e.g., a customer). For the purposes of this description, a system integrator includes without limitation any number of vehicle manufacturers and major-system subcontractors; a third party includes without limitation any number of venders, subcontractors, and suppliers; and an operator is an airline, leasing company, military entity, service organization, and so on.

Figure 7:
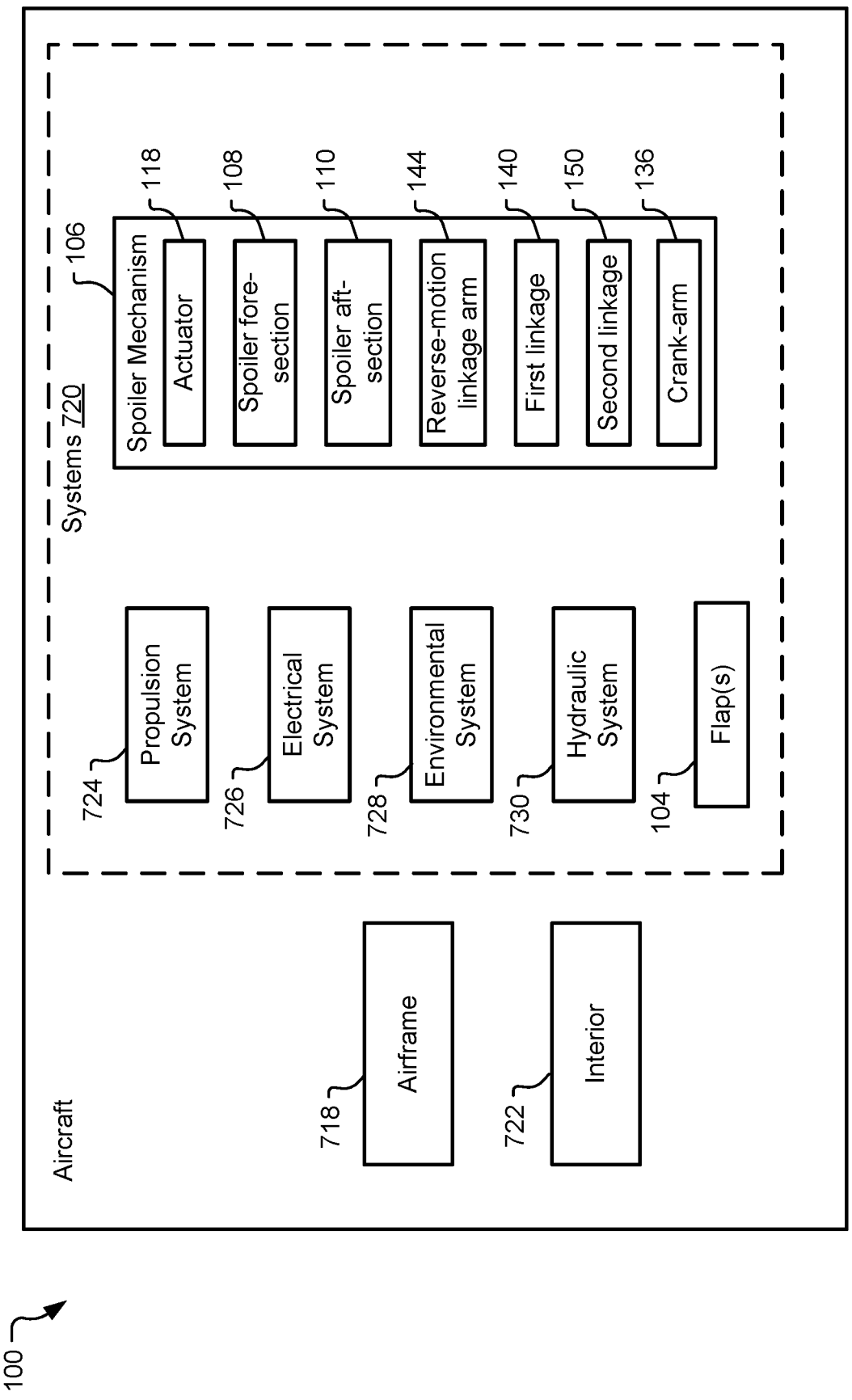
FIG. 7 is a block diagram of the aircraft and the spoiler mechanism of FIG. 1.

FIG. 7 is a block diagram of a particular example of the aircraft 100 and the spoiler mechanism 106 of FIG. 1. In a particular implementation, the aircraft 100 is produced by at least a portion of the method 600 of FIG. 6. As shown in FIG. 7, the aircraft 100 includes an airframe 718 with a plurality of systems 720 and an interior 722. Examples of the plurality of systems 720 include one or more of a propulsion system 724, an electrical system 726, an environmental system 728, a hydraulic system 730, a spoiler mechanism 106 and one or more flaps 104. The spoiler mechanism 106 includes the actuator 118, the spoiler fore-section 108, the spoiler aft-section 110, the reverse-motion linkage arm 144, the first linkage 140, the second linkage 150, and the crank-arm 136. Any number of other systems may also be included in the aircraft 100.

Apparatus and methods included herein can be employed during any one or more of the stages of the method 600 of FIG. 6. For example, components or subassemblies corresponding to production process 608 can be fabricated or manufactured in a manner similar to components or subassemblies produced while the aircraft 100 is in service, at 612 for example and without limitation. Also, one or more apparatus implementations, method implementations, or a combination thereof can be utilized during the production stages (e.g., stages 602-610 of the method 600), for example, by substantially expediting assembly of or reducing the cost of the aircraft 100. Similarly, one or more of apparatus implementations, method implementations, or a combination thereof can be utilized while the aircraft 100 is in service, at 612 for example and without limitation, to maintenance and service, at 614.

Although one or more of FIGS. 1-7 may illustrate systems, apparatuses, and/or methods according to the teachings of the disclosure, the disclosure is not limited to these illustrated systems, apparatuses, and/or methods. One or more functions or components of any of FIGS. 1-7 as illustrated or described herein may be combined with one or more other portions of another of FIGS. 1-7. Accordingly, no single implementation described herein should be construed as limiting and implementations of the disclosure may be suitably combined without departing form the teachings of the disclosure. As an example, one or more operations described with reference to FIGS. 5-6 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A spoiler mechanism for an aircraft, the spoiler mechanism comprising:
   a spoiler fore-section including:
      a forward end;
      a hinge end;
      a pivot coupling to couple the forward end to a wing structure of an aircraft and to enable rotation of the spoiler fore-section relative to the wing structure; and
      an actuator coupling;
   a spoiler aft-section including:
      a hinge portion pivotally coupled to the hinge end of the spoiler fore-section; and
      a crank-arm proximate a lower side of a forward end of the spoiler aft-section;
   a reverse-motion linkage arm including:
      a first end;
      a second end; and
      a pivot point coupled to the forward end of the spoiler fore-section;
   a first linkage to couple the first end of the reverse-motion linkage arm to the wing structure; and
   a second linkage coupled to the second end of the reverse-motion linkage arm and to the crank-arm on the spoiler aft-section,
   wherein rotation of the spoiler fore-section in a first rotational direction causes rotation of the reverse-motion linkage arm about the pivot point in a second rotational direction opposite the first rotational direction and applies a force to the crank-arm of the spoiler aft-section to cause rotation of the spoiler aft-section in the first rotational direction about the hinge portion, and wherein the reverse-motion linkage arm is configured to apply a force to the crank-arm via the second linkage.

2. The spoiler mechanism of claim 1, further comprising an actuator coupled to the actuator coupling and to the wing structure, the actuator configured to extend to cause upward rotation of the spoiler fore-section about the pivot coupling.

3. The spoiler mechanism of claim 1, wherein, when the spoiler fore-section is rotated upward to a first angle that is at least five degrees relative to a bulk airflow direction, the spoiler aft-section is rotated upward to a second angle that is greater than the first angle.

4. The spoiler mechanism of claim 1, wherein the spoiler fore-section is rotatable up to a first angle of no more than 40 degrees relative to a bulk airflow direction and the spoiler aft-section is rotatable up to a second angle of at least 80 degrees relative to the bulk airflow direction.

5. The spoiler mechanism of claim 1, wherein the spoiler aft-section is rotatable up to an angle of greater than or equal to 80 degrees relative to a bulk airflow direction responsive to an actuator extension of less than or equal to 3 inches.

6. The spoiler mechanism of claim 1, wherein actuator extension moves the spoiler fore-section and the reverse-motion linkage arm relative to the wing structure, where movement of the reverse-motion linkage arm relative to the wing structure produces a force that is applied in a forward direction via the first linkage to the first end of the reverse-motion linkage arm, which rotates the reverse-motion linkage arm and causes an aft-direction force to be applied by the second end of the reverse-motion linkage arm to the second linkage to displace the crank-arm on the spoiler aft-section.

7. The spoiler mechanism of claim 1, wherein the spoiler fore-section and the spoiler aft-section are rotatable in the first rotational direction from a neutral position responsive to an actuator extension and are rotatable in the second rotational direction from the neutral position responsive to an actuator retraction.

8. The spoiler mechanism of claim 7, wherein, during operation of the aircraft, the rotation of the spoiler fore-section and the spoiler aft-section in the first rotational direction from the neutral position extends the spoiler fore-section and the spoiler aft-section into a bulk airflow to generate a downward force on the wing structure.

9. The spoiler mechanism of claim 7, wherein, during operation of the aircraft, the rotation of the spoiler fore-section and the spoiler aft-section in the second rotational direction from the neutral position extends the spoiler fore-section and the spoiler aft-section toward a flap that is in a deployed position relative to the wing structure.

10. An aircraft comprising:
a wing structure coupled to a flap and to a spoiler mechanism;
an actuator coupled to the wing structure;
the spoiler mechanism including:
a spoiler fore-section including:
a forward end including a pivot coupling coupled to the wing structure and enabling rotation of the spoiler fore-section relative to the wing structure;
a hinge end; and
an actuator coupling coupled to the actuator;
a spoiler aft-section including:
a hinge portion pivotally coupled to the hinge end of the spoiler fore-section; and
a crank-arm;
a reverse-motion linkage arm including:
a first end;
a second end; and
a pivot point coupled to the forward end of the spoiler fore-section;
a first linkage coupled to the first end of the reverse-motion linkage arm and coupled to the wing structure; and
a second linkage coupled to the second end of the reverse-motion linkage arm and coupled to the crank-arm of the spoiler aft-section, wherein the reverse-motion linkage arm is configured to apply a force to the crank-arm via the second linkage.

11. The aircraft of claim 10, wherein rotation of the spoiler fore-section in a first rotational direction causes rotation of the reverse-motion linkage arm about the pivot point in a second rotational direction opposite the first rotational direction and applies a force to the crank-arm of the spoiler aft-section to cause rotation of the spoiler aft-section in the first rotational direction about the hinge portion.

12. The aircraft of claim 11, wherein retraction of the actuator causes the spoiler mechanism to deploy in a droop configuration via rotation of the spoiler fore-section and rotation of the spoiler fore-section in the second rotational direction.

13. The aircraft of claim 10, wherein extension of the actuator causes the spoiler mechanism to deploy in a braking configuration via rotation of the spoiler fore-section and rotation of the spoiler aft-section in a first rotational direction.

14. The aircraft of claim 13, wherein, when the spoiler mechanism is deployed in the braking configuration during operation, the spoiler fore-section has a first angle relative to a bulk airflow direction, the spoiler aft-section has a second angle relative to the bulk airflow direction, and the second angle is greater than the first angle.

15. The aircraft of claim 13, wherein the spoiler fore-section is rotatable up to a first angle of no more than 40 degrees relative to a bulk airflow direction and the spoiler aft-section is rotatable up to a second angle of at least 80 degrees relative to the bulk airflow direction.

16. The aircraft of claim 10, wherein the spoiler fore-section includes a substantially flat spoiler fore-section lower surface and the spoiler aft-section includes a substantially flat spoiler aft-section lower surface, and wherein the flap is accommodated in an angle between the substantially flat spoiler fore-section lower surface and the substantially flat spoiler aft-section lower surface when the flap and the spoiler mechanism are in a non-deployed state.

17. A method of controlling a spoiler of an aircraft, the method comprising:
responsive to movement of an actuator, rotating a spoiler fore-section in a first rotational direction about a pivot coupling at a forward end of the spoiler fore-section, wherein rotation of the spoiler fore-section moves a hinge end of the spoiler fore-section to cause the spoiler fore-section to have a first angle relative to a bulk airflow direction associated with a wing structure;
responsive to rotation of the spoiler fore-section in the first rotational direction, applying a first force, via a first linkage, to a reverse-motion linkage arm coupled to the forward end of the spoiler fore-section to cause rotation of the reverse-motion linkage arm in a second rotational direction opposite the first rotational direction;
responsive to rotation of the reverse-motion linkage arm in the second rotational direction, applying a second force, via a second linkage, to a crank-arm coupled to a hinge portion of a spoiler aft-section that is coupled to the hinge end of the spoiler fore-section; and
responsive to the second force, rotating the spoiler aft-section in the first rotational direction about the hinge portion of the spoiler aft-section.

18. The method of claim 17, wherein the movement of the actuator includes an extension of the actuator by less than or equal to 3 inches and the rotation of the spoiler aft-section is to an angle of greater than or equal to 80 degrees relative to the bulk airflow direction.

19. The method of claim 17, wherein the spoiler fore-section is rotated to a first angle of no more than 40 degrees relative to the bulk airflow direction when the spoiler aft-section is rotated to a second angle of at least 80 degrees relative to the bulk airflow direction.

20. The method of claim 17, wherein the movement of the actuator includes a retraction of the actuator to deploy the spoiler fore-section and the spoiler aft-section in a droop configuration.

* * * * *